(12) United States Patent
Robinson et al.

(10) Patent No.: US 7,580,476 B2
(45) Date of Patent: Aug. 25, 2009

(54) COMMUNICATION SYSTEM AND METHOD FOR IMPROVING EFFICIENCY AND LINEARITY

(75) Inventors: Ian Robinson, Venice, CA (US); Frank Winter, San Diego, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 805 days.

(21) Appl. No.: 10/606,721

(22) Filed: Jun. 26, 2003

(65) Prior Publication Data

US 2004/0264416 A1    Dec. 30, 2004

(51) Int. Cl.
    H04L 25/49    (2006.01)
(52) U.S. Cl. .................................................. 375/297
(58) Field of Classification Search .......... 375/295–297
    See application file for complete search history.

(56) References Cited

U.S. PATENT DOCUMENTS

| | | | |
|---|---|---|---|
| 5,323,396 A * | 6/1994 | Lokhoff | 370/468 |
| 5,903,555 A | 5/1999 | Wildauer et al. | |
| 6,104,996 A * | 8/2000 | Yin | 704/500 |
| 6,294,956 B1 * | 9/2001 | Ghanadan et al. | 330/124 R |
| 6,307,892 B1 | 10/2001 | Jones et al. | |
| 6,314,146 B1 * | 11/2001 | Tellado et al. | 375/346 |
| 7,080,006 B1 * | 7/2006 | Kupferschmidt et al. | 704/200.1 |
| 2002/0061068 A1 * | 5/2002 | Leva et al. | 375/260 |
| 2003/0099302 A1 * | 5/2003 | Tong et al. | 375/264 |
| 2003/0142621 A1 * | 7/2003 | Uesugi | 370/203 |
| 2004/0086054 A1 * | 5/2004 | Corral | 375/260 |

FOREIGN PATENT DOCUMENTS

WO    WO 0143320 A2 *    6/2001
WO    WO 02058294 A1 *    7/2002

OTHER PUBLICATIONS

Muller et al "OFDM with Reduced Peak-to-Average Power Ratio by Multiple Signal Representation", vol. 52, No. 1/2, Feb. 1997, XP 000991143.*

Henry Kwok and Douglas Jones, "PAR Reduction Via Constellation Shaping", ISIT 2000, Sorrento, Italy, Jun. 25-30, 2000, p. 166.

European Search Report for EP 03 025 730.7 filed Nov. 10, 2003; Report completed Oct. 28, 2004.

Farnese D et al: "Pulse Superposition: A Technique for Peak-to-Average Power Ratio Reduction in OFDM Modulation"; ICC 2002. 2002 IEEE International Conference on Communications. Conference Proceedings. New York, NY Apr. 28-May 2, 2002, IEEE International Conference on Communications, New York, NY: IEEE, US, vol. vol. 3 of 5, Apr. 28, 2002, pp. 1682-1685, XP001046168 ISBN: 0-7803-7400-2 *abstract* *p. 1682, left-hand column, lines 10-24* * p. 1682, right-hand column, last paragraph—p. 1683, right-hand column, line 2* *figures 1,2*.

(Continued)

*Primary Examiner*—Kevin M Burd
(74) *Attorney, Agent, or Firm*—Tarolli, Sundheim, Covell & Tummino LLP

(57) ABSTRACT

A communication system and method is provided that modifies a signal for transmission at a transmitter to reduce peaks associated with the signal. The signal can be modified employing signal shaping, signal clipping, signal decomposition or other techniques to remove peaks associated with the signal. The communication system can also correct the modified signal at a receiver to reconstruct the originally wanted signal.

17 Claims, 6 Drawing Sheets

OTHER PUBLICATIONS

Mueller S H et al.: *"OFDM With Reduced Peak-to-Average Power Ratio by Multiple Signal Representation—Reduction Du Facteur De Crete en OFDM Par Representation Multiple Du Signal"*; Annales Des Telecommunication—Annals of Telecommunications, Presses Polytechniques et Universitaires Romandes, Lausanne, CH, vol. 52, No. 1/2, Feb. 1997, pp. 58-67, XP000991143 ISSN: 0003-4347 *p. 58, right-hand column, last paragraph—p. 59, left-hand column, line 22* *p. 62, left-hand column, line 1—page 63, right-hand column, line 16* *figures 3-5*.

Jayalath A D S et al: *"Reduced Complexity PTS and New Phase Sequences for SLM to Reduce PAP of an OFDM Signal"*; VTC 2000—Spring. 2000 IEEE 51st. Vehicular Technology Conference Proceedings. Tokyo, Japan, May 15-18, 2000, IEEE Vehicular Technology Conference, New York, NY: IEEE, US, vol. vol. 3 of 3. Conf. 51, May 15, 2000, pp. 1914-1917, XP000968337 ISBN: 0-7803-5719-1 *p. 1915, left-hand column, line 8—p. 1916, left-hand column, line 17* *figures 1, 2*.

* cited by examiner

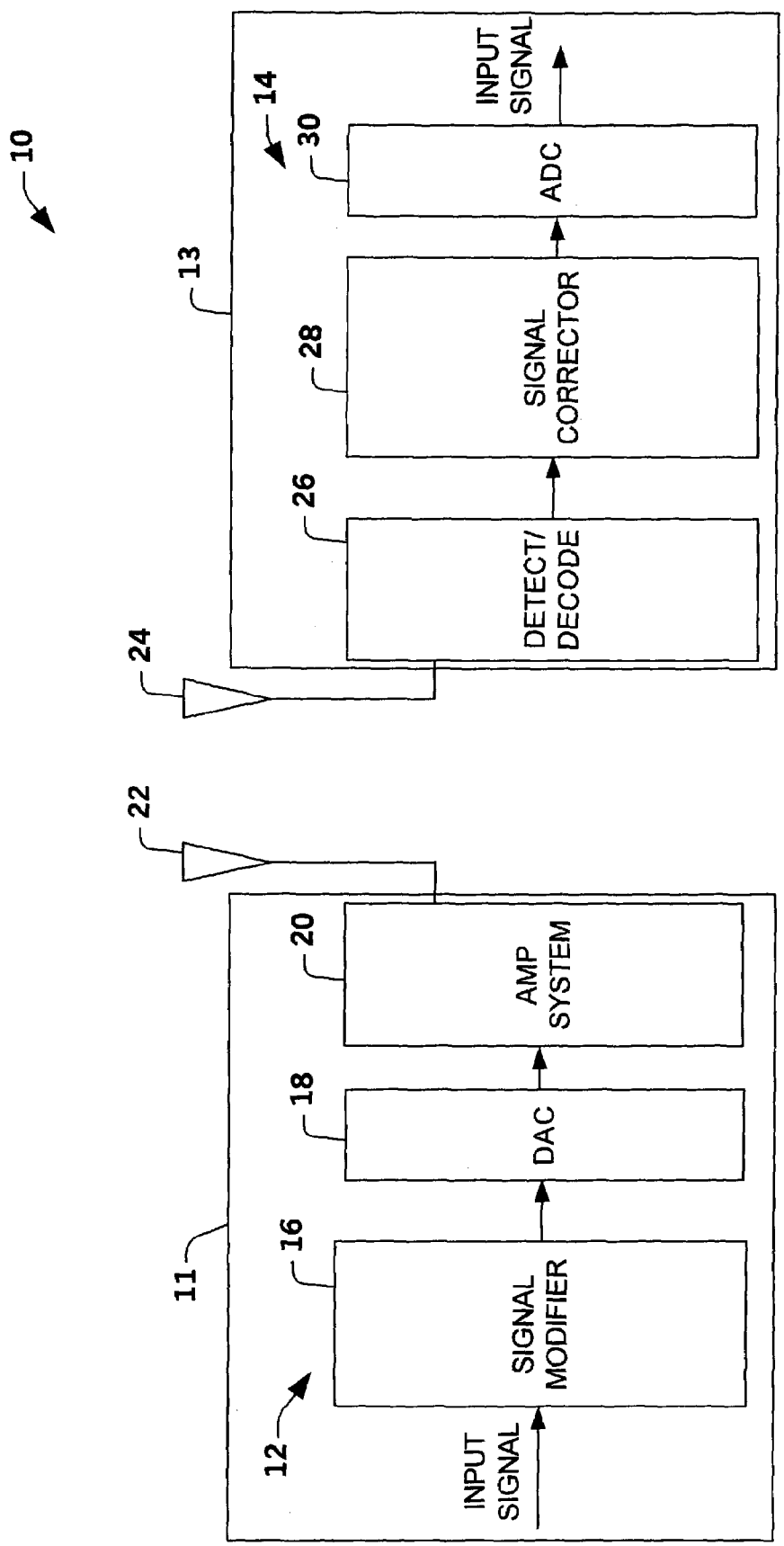

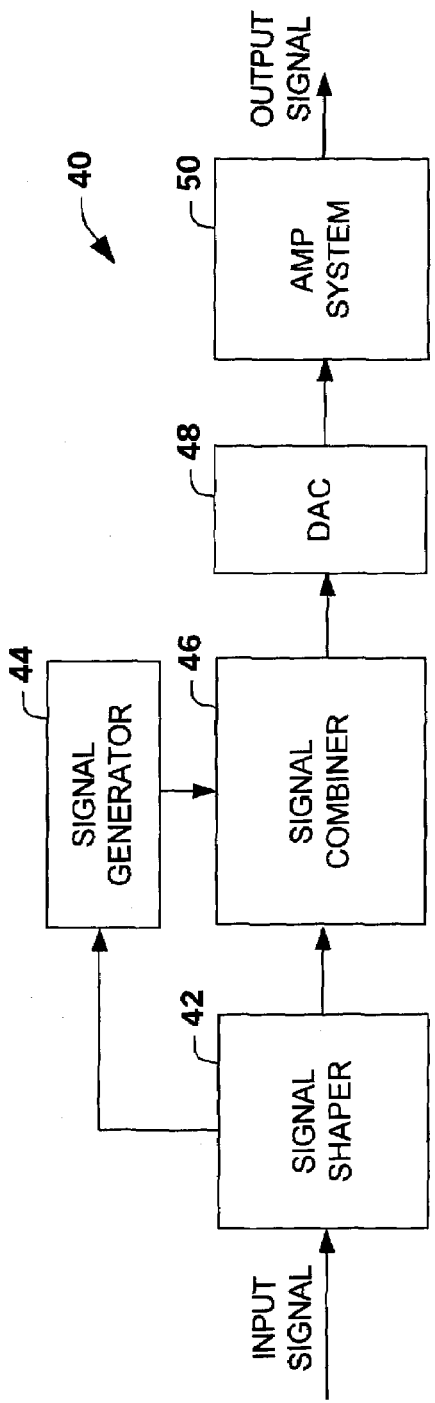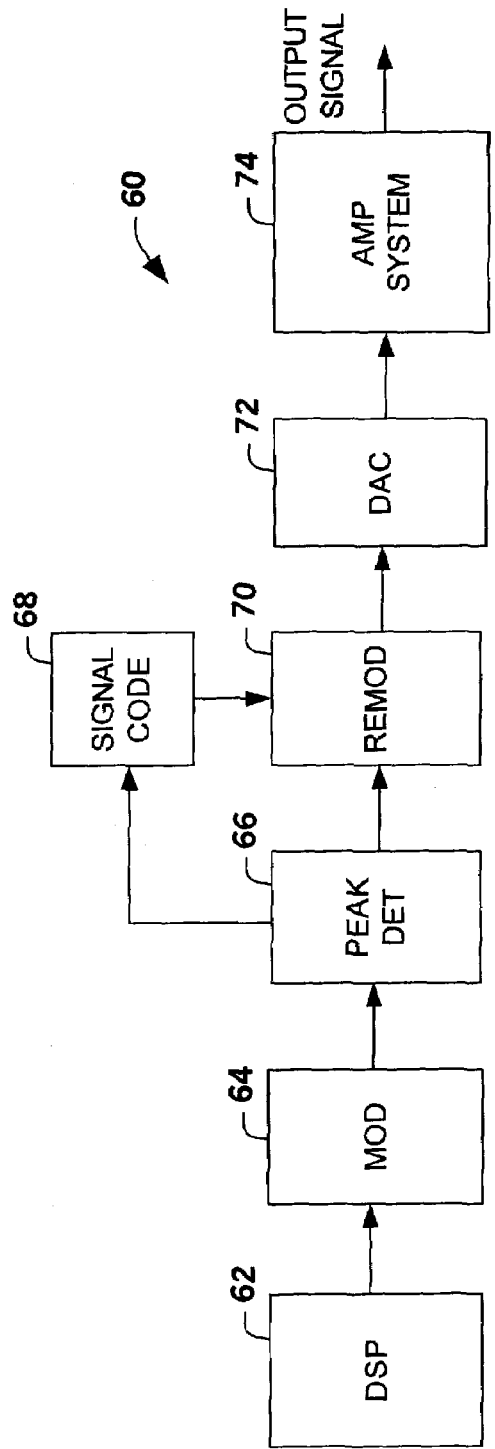

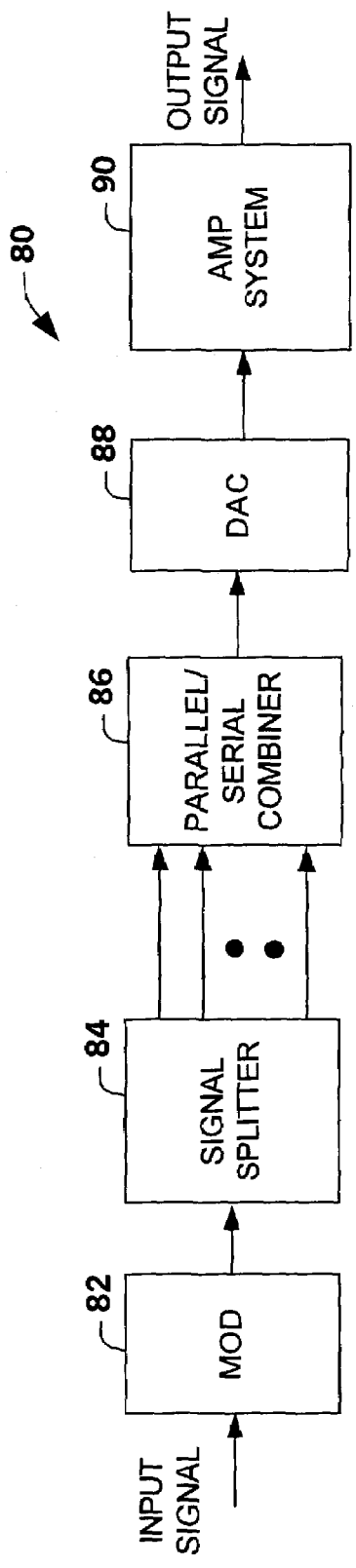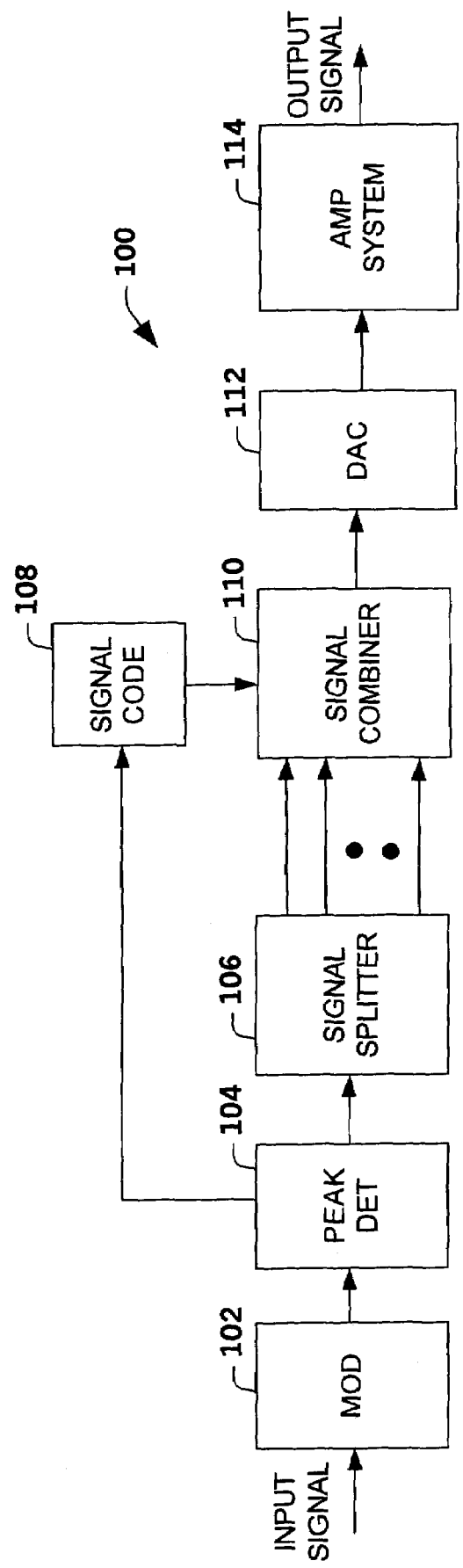

COMMUNICATION SYSTEM AND METHOD FOR IMPROVING EFFICIENCY AND LINEARITY

TECHNICAL FIELD

The present invention relates generally to electronic devices, and more particularly to a system and method for improving efficiency and linearity in communications.

BACKGROUND OF THE INVENTION

RF power amplifiers used for wireless communication transmitters, with spectrally efficient modulation formats, require high linearity to preserve modulation accuracy and to limit spectral regrowth and other unwanted out-of-band (OOB) emissions. Typically, a linear amplifier, Class-A type, Class-AB type or Class-B is employed to faithfully reproduce inputs signals and to limit the amplifier output within a strict emissions mask. Linear amplifiers are capable of electrical (DC power in to RF power out or DC-RF) efficiencies of 50% and greater when operated at saturation. However, they are generally not operated at high efficiency due to the need to provide high linearity. For constant envelope waveforms, linear amplifiers are often operated below saturation to provide operation in their linear regime. Time varying envelopes present an additional challenge. The general solution is to amplify the peaks of the waveform near saturation, resulting in the average power of the waveform being amplified at a level well backed-off from saturation. The back-off level, also referred to as output power back-off (OPBO), determines the electrical efficiency of a linear amplifier.

Modern transmitters for applications such as cellular, personal, and satellite communications employ digital modulation techniques such as quadrature phase-shift keying (QPSK) in combination with techniques such as code division multiple access (CDMA). Use of multiple frequencies, simultaneous codes, and/or shaping of the data pulses to mitigate out-of-band emissions from occurring into adjacent channels produces time-varying envelopes. In general these signals, especially those created by multi-carrier signals, have high wide distribution of power levels resulting in a large peak-to-average ratio (PAR). Therefore, the operation of the linear amplifiers in these types of signals is very inefficient, since the amplifiers must have their supply voltage sized to handle the large peak voltages even though the signals are much smaller a substantial portion of the time. Additionally, the size and cost of the power amplifier is generally proportional to the required peak output power of the amplifier.

Wideband Code Division Multiple Access (WCDMA), Orthogonal Frequency Division Multiplexing (OFDM), and multi-carrier versions of both Global System for Mobile Communication (GSM) and Code Division Multiple Access 2000 (CDMA 2000) are wireless standards and application growing in use. Each requires amplification of a waveform with high PAR levels, above 10 dB in some cases. The sparse amount of spectrum allocated to terrestrial wireless communication requires that transmissions minimize out-of-band (OOB) emissions to minimize the interference environment. A class "A" linear amplifier used to amplify a waveform with a PAR of 10 dB or more provides only 5-10% DC-RF efficiency. The peak output power for the amplifier is sized by the peak waveform. The cost of the amplifier scales with its peak power.

Several other circuit costs including heat sinks and DC-DC power supplies scale inversely to peak power and dissipated heat (which results from the electrical inefficiency). Related base station costs of AC-DC power supplies, back-up batteries, cooling, and circuit breakers also scale inversely with efficiency as does the electrical operating costs. Clearly, improving DC-RF efficiency is a major cost saver both for manufacture and operation. Non-linear classes (e.g., Class C, D, E and F type amplifiers) of RF power amplifiers switch the RF devices on and off in or near saturation, and are more efficient than linear classes of operation such as Class-A, Class-AB or Class-B type which conduct during at least half of the RF cycle and are significantly backed off from compression. However, non-linear amplifiers can only be employed with constant envelope signals, such as frequency modulations (FM) and certain forms of phase modulation (PM). Signals with modulated amplitudes cause severely distorted outputs from these classes of amplifiers.

Many modern digital communications systems transmit complex waveforms consisting of multiple carriers, multiple code channels, or other signals that give rise to large, infrequent peaks in signal power. These signals are costly to transmit in terms of hardware and electrical consumption. Systems that reduce the size of the peaks without introducing substantial levels of error can operate at lower cost and greater electrical efficiency; these are clearly desirable characteristics.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention relates to a communication system having a communication device that includes a transmitter operative to modify a signal for transmission to reduce peaks associated with the signal. The signal can be modified employing signal shaping, signal clipping, signal decomposition or other techniques to remove peaks associated with the signal. The communication system can also include a communication device that includes a receiver that corrects the modified signal to reconstruct the originally wanted signal.

In one aspect of the present invention, one or more instruction signals are transmitted to instruct the receiver how to revise the signal modification enabling substantial peak to average (PAR) reduction. The instruction signal or codes can be sent in a parallel or sequential relationship with the peak reduced input signal. The instruction signals or codes indicate to the receiver the nature of the signal modification (e.g., the modification to the modulation constellation) so the modification can be partially or wholly reversed. This allows more aggressive peak reduction than can be accomplished at the transmitter alone, as errors are repaired at the receiver.

In another aspect of the present invention, the input signal is decomposed into two or more replica signals of the input signal whose sum is the wanted signal. The replica signals can be added to other wanted signals, which may be similarly decomposed. Many receivers are equipped to detect time delay signal replicas that occur because portions of the received signal have traveled different lengths to the receiver (the so-called "multi-path" scenario). In this aspect of the invention the signals will appear at the receiver to be "multi-path" replicas or signals that have propagated over different paths. The replica signals can be transmitted with or without an instruction signal. Receivers designed to recognize and re-combine multi-path versions of a signal can be employed without an instruction signal.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 1 illustrates a schematic block diagram of communication system in accordance with an aspect of the present invention.

FIG. 2 illustrates a schematic block diagram of a transmitter employing an instruction signal in accordance with an aspect of the present invention.

FIG. 3 illustrates a schematic block diagram of a transmitter employing an instruction code in accordance with an aspect of the present invention.

FIG. 4 illustrates a schematic block diagram of a transmitter that decomposes a signal into a plurality of replica signals in accordance with an aspect of the present invention.

FIG. 5 illustrates a schematic block diagram of a transmitter that decomposes a signal into a plurality of replica signals in accordance with another aspect of the present invention.

DETAILED DESCRIPTION OF INVENTION

Figure 6:
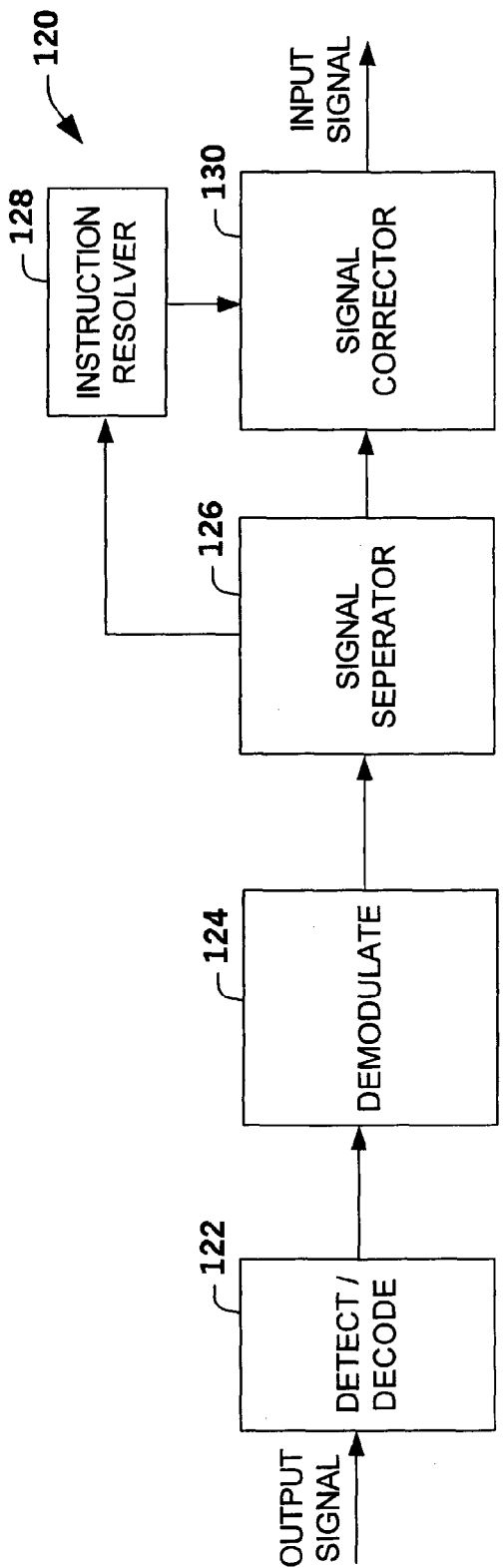
FIG. 6 illustrates a schematic block diagram of a receiver that reconstructs a modified input signal employing a construction signal or code in accordance with another aspect of the present invention.

The present invention relates to a communication system having a communication device with a transmitter that modifies a signal for transmission to reduce peaks associated with the signal. The communication system also includes a communication device with a receiver that corrects the modified signal to reconstruct the originally wanted signal. The communication system allows for smaller transmission power amplifiers to be employed at the transmitter(s) of the communication devices, since the peaks associated with the transmission signals have been reduced. Additionally, errors associated with peak reduction are mitigated since the receiver is operative to reconstruct the transmission signal to its originally wanted form.

The present invention reduces peak communication signals to a greater degree than previous communication systems, while limiting degradations to signal error vector magnitude (EVM), receiver bit error rate (BER) or symbol error rate (SER). Existing techniques to reduce peak-to-average ratios (PAR) are content with the resultant degradations to wanted signals (characterized by EVM) and out-of-band (OOB) emissions.

FIG. 1 illustrates a communication system 10 in accordance with an aspect of the present invention. The communication system 10 includes a first communication device 11 having a transmitter 12 and a second communication device 13 having a receiver 14. The first communication device 11 can be a base station and the second communication device 13 can be a mobile communication unit (MCU) in a wireless communication system. Alternatively, the second communication device 13 can be a base station and the first communication device 11 can be a mobile communication unit (MCU). It is to be appreciated that the two communication device system shown in FIG. 1 is for illustrative purposes, and that the communication system 10 can include a plurality communication devices each having one or more transmitters and receivers.

The transmitter 12 includes a signal modifier 16 that receives an input signal, for example, from a digital signal processor (DSP) or the like. The signal modifier 16 modifies the input signal to reduce peaks associated therewith. The signal modifier 16 also can generate an instruction signal or an instruction code that defines the modification that has occurred to the input signal to reduce the peaks associated with the input signal. The signal modifier 16 then provides the peak reduced signal and the instruction signal. The instruction signals can be sent in parallel (e.g., on a separate frequency or on an orthogonal code) or sequentially with the peak reduced signal. The instruction signal indicates to the receiver 14 the nature of the modification to the modulation constellation, so the modification can be partially or wholly reversed. This allows more aggressive peak reduction at the transmitter 12 as errors are repaired at the receiver 14.

For example, the signal modifier 16 can employ constellation shaping to reduce the peaks and out-of-band (OOB) emissions associated with peak reduction. Constellation shaping is a technique that modifies the modulation constellation of signal to reduce peaks, deliberately introducing errors in the modulation. A bit or symbol transmitted with an erroneous modulation normally cannot be corrected at the receiver and has an increased probability of resulting in a bit or symbol error. The present invention enables greater peak-to-average ration (PAR) reduction by defining one or more additional signals (instruction signals or instruction codes) to be transmitted with the peak reduced signal. The instruction signals or codes provide the receiver with the necessary information on how to reverse the modifications. Other techniques can be employed to reduce PAR levels including clipping, and selection of optimum signal components (e.g., carrier phase, code selection, frequency, code timing offset).

For communications using code channels (e.g., CDMA, WCDMA, CDMA2000), the addition of a unique code channel(s) is easily adopted for the additional signals. An allocation of one or a few specific frequencies can be used for systems using multiple carriers to convey information (e.g., OFDM, Multiple Carrier (MC)-CDMA, Discrete Multi-tone (DMT)). In certain situations, it may be necessary for the receiver to buffer data for a short period to extract the additional signals. The secondary scaling information can be sent in an additional time slot for systems operating with Time Division Multiple Access (TDMA). It is also possible to add a carrier or a polarization code to show the additional information for nominally single carrier systems. It is also possible to add a code channel to signals that use other techniques.

In another aspect of the invention, the signal modifier 16 separates or decomposes the input signal into two or more replicas of the input signal scaled in amplitude. Recombining the two or more replicas results in the original wanted input signal. For example, the signal can be stored briefly (e.g., in digital memory) by the signal modifier and decomposed into two or more replicas whose sum is the wanted signal. These replicas are added to other wanted signals, which may be similarly decomposed. The signals will appear at the receiver to be delayed by different lags, the same result as signals reflecting off multiple surfaces creating "multi-path" replicas. The two or more replicas can be combined with an instruction signal that can be sent in parallel or sequentially. Alternatively, a receiver can be employed that is already designed, for some formats (e.g., rake receivers for CDMA style signals), to recognize and re-combine multi-path versions of a signal without the use of an instruction signal.

The signal modifier 16 then provides the modified signal(s) with or without the instruction signal to a digital-to-analog converter (DAC) 18. The DAC 18 converts the signals from the digital domain to the analog domain. The analog signals are then provided to an amplifier system 20 for amplification. The amplifier system 20 includes a power amplifier (not shown). The power amplifier can be a linear amplifier (e.g., Class-A, Class-AB, Class-B) or, for some classes of input signal, it can be a non-linear type amplifier (e.g., Class-C, Class-D, Class-E, Class-F) based on desired performance, acceptable efficiency and acceptable OOB emissions. The modified signal (s) with or without the instruction signal are then transmitted over a wireless link via an antenna 22.

In one aspect of the invention, the DAC 18 is a delta sigma modulated DAC (e.g., 1-bit delta sigma DAC, multi-bit delta sigma DAC). Delta Sigma modulation is a technique used to generate a coarse estimate of a signal using a small number of quantization levels usually at a very high sampling rate. The small number (two levels for a one-bit quantizer) of discrete levels introduces "quantization" noise into the system. The effect of oversampling and the use of an integrator feedback-loop in delta-sigma modulation are effective in shifting noise to out-of-band frequencies. The noise shifting properties and introduction of quantization error enables efficient use of subsequent filtering stages to remove noise and produce a more precise representation of the input at a much higher frequency. The delta sigma DACs can be employed to upconvert the input signal directly to radio transmission frequencies, such that further frequency conversion of the signals via conventional analog mixers is not required. The radio transmission frequencies can be in radio frequency (RF) ranges (e.g., megahertz range) or in microwave frequency ranges (e.g., gigahertz range).

An antenna 24 captures transmission signals from the transmitter 12, and provides the transmission signals to a detector/decoder 26. The detector/decoder 26 detects the received signals and decodes and/or demodulates the received signals, which are then provided to a signal corrector 28. The signal corrector 28 receives the modified output signal(s) and any instruction signals or codes that originate from the transmitter 12 associated with the modified output signal(s). The signal corrector 28 then reconstructs the signal based on the instruction signal or code to its original format prior to modification to provide the originally wanted input signal. Alternatively, the signal corrector 28 can combine one or more replicas of the input signal into the original wanted input signal based on an instruction signal or code, or employing multi-path algorithms to reconstruct the original wanted input signal prior to modification by the signal modifier 16. The signal corrector 28 then provides the demodified reconstructed input signal to an analog-to-digital converter (ADC) 30. The ADC 30 converts the analog signal into a digital signal for further processing by the receiver 14.

FIG. 2 illustrates a schematic block diagram of a transmitter 40 in accordance with an aspect of the present invention. The transmitter 40 includes a signal or constellation shaper 42. The signal shaper 42 modifies the modulation constellation or signal to reduce peaks. A variety of different constellation shaping techniques can be employed to reduce peaks associated with the input signal. The signal shaper 42 is coupled to a signal generator 44. The signal shaper 42 provides information to the signal generator 44 corresponding to modifications of the input signal by the signal shaper 42. The signal generator 44 then generates an instruction signal or code that informs the receiver that the input signal has been modified and information associated with that modification. Alternatively, the information associated with that modification can reside at the receiver such that a number of known modifications are performed at the transmitter and reconstructed at the receiver based on a defined instruction signal or code. For example, a simple system can employ a minimal instruction signal that is zero most of the time and takes one or a small number of values coded to a fixed scaling factor when a signal is clipped.

A signal combiner 46 receives the modified or shaped input signal and the instruction signal or code defining the extent of the modifications (e.g., scaling). The modified or shaped input signal and the instruction signal are combined for transmission. The combination of the shaped input signal and the instruction signal can be sent in parallel or sequentially. The instruction signal can be transmitter after or before the shaped input signal in a sequential manner. Alternatively, the instruction signal can be combined with the shaped input signal and transmitted in parallel. The instruction signal can be modulated into the shaped signal. For example, the addition of a unique code channel (s) can be employed for the instruction signal for communications using code channels (e.g., CDMA, WCDMA, CDMA2000, spread spectrum). The instruction signal can be provided in one or a few specific frequencies in systems employing multiple carriers to convey information (e.g., OFDM, MC-CDMA, DMT). The instruction signal can be provided in an additional time slot for systems operating with TDMA.

The signal combiner 46 then provides the shaped signal and instruction signal to a DAC 48 (e.g., 1-bit delta sigma DAC, multi-bit delta sigma DAC). The DAC 48 converts the signals from the digital domain to the analog domain. The analog signals are then provided to an amplifier system 50 for amplification. The amplifier system 50 includes a power amplifier (not shown). The power amplifier can be a linear amplifier (e.g., Class-A, Class-AB, Class-B). For a linear amplifier (class A, A/B, B) there is up to a dB for dB savings in size and cost of the selected amplifier with the peak-to-average ratio (PAR) reduction of the amplification system 50. Thus, if the present invention enables clipping the signal 3 dB greater than other techniques, the potential cost savings to the amplifier is about 50%. Therefore, the present invention allows for employment of a power amplifier that is smaller (less power) and operates more efficiently than amplification systems without PAR reduction. There is also a significant improvement available in DC-RF efficiency. Efficiency savings reduce board costs and a range of costs associated with the infrastructure of a transmitter, such as batteries or backup batteries, AC-DC power converters, and cooling systems.

FIG. 3 illustrates a transmitter 60 in accordance with another aspect of the present invention. The transmitter 60 includes a digital signal processor (DSP) 62 that generates an input signal for transmission. The input signal can be a single carrier or multi-carrier device. The input signal is then provided to a modulator 64 that modulates the input signal according to a predefined modulation standard (e.g., CDMA, WCDMA). The modulated signal is then provided to a peak detector/clipper 66. The peak detector/clipper 66 detects and removes peak signals associated with an input signal. The peak detector/clipper 66 provides a peak reduced input signal to a remodulator 70.

The peak detector/clipper 66 also provides information to a signal code generator 68. The signal code generator 68 generates a code associated with the peak reduction. The signal code generator 68 can be a look up table and/or algorithm that provides information regarding modifications to the input signal. The peak reduced input signal and generated code are provided to the remodulator 70 that can demodulate the peak reduced input signal and remodulate the peak reduced input signal with the instruction code embedded therein. Alternatively, the remodulator 70 can provide an additional modulation that modulates the signal instruction code into the already modulated peak reduced input signal. The remodulator 70 can contain a filter to remove unwanted out-of-band emissions resulting from clipping.

The remodulator 70 then provides the peak reduced input signal with the instruction code embedded therein to a DAC 72 (e.g., 1-bit delta sigma DAC, multi-bit delta sigma DAC). The DAC 72 converts the signals from the digital domain to the analog domain. The analog signals are then provided to an amplifier system 74 for amplification. The amplifier system includes a power amplifier that can be a linear amplifier (e.g., Class-A, Class-AB, Class-B). Employing a linear amplifier (class A, A/B, B) in the transmitter 60 will provide outputs with lower distortions and reduced OOB if the peak signals are reduced.

The techniques of FIGS. 1-3 can result in the PAR level of complex communications signals being significantly decreased. For example, reducing a four carrier WCDMA signal from a PAR of 10 dB to a PAR of 5 dB is well within reach. This change enables a three times reduction in power amplifier size and cost and will allow a class A/B amplifier transmitter to double its DC-RF efficiency from less than 10% to almost 20%.

FIG. 4 illustrates a transmitter 80 that generates replica signals in accordance with another aspect of the present invention. The transmitter 80 includes a modulator 82 that modulates an input signal that can be a single carrier or multi-carrier signal. The modulator 82 modulates the input signal according to a predefined modulation standard (e.g., CDMA, WCDMA, OFDM, TDMA). The modulated signal is then provided signal splitter or signal decomposer 84. The signal splitter 84 decomposes the signal into two or more replicas of the input signal with each replica having peak amplitudes that are less than or below the peak amplitudes of the input signal. The two or more replicas are then provided to a parallel-to-serial combiner 86 that sequentially combines the two or more replicas into a predetermined order for transmission.

The parallel-to-serial combiner 86 then provides the sequentially ordered two or more replicas to a DAC 88 (e.g., 1-bit delta sigma DAC, multi-bit delta sigma DAC). The DAC 88 converts the signals from the digital domain to the analog domain. The analog signals are then provided to an amplifier system 90 for amplification. The amplifier system 90 includes a power amplifier (not shown) that can be a linear amplifier (e.g., Class-A, Class-AB, Class-B). In this aspect of the invention, a receiver operative to reconstruct signals from multipath signals such as that employed in CDMA or the like, can be utilized without any or without substantial modifications to the receiver.

FIG. 5 illustrates a transmitter 100 that generates replica signals in accordance with another aspect of the present invention. The transmitter 100 includes a modulator 102 that modulates an input signal that can be a single carrier or multi-carrier signal. The modulator 102 modulates the input signal according to a predefined modulation standard (e.g., CDMA, WCDMA, OFDM, TDMA). The modulated signal is then provided to a peak detector 104. The peak detector 104 detects peak signals associated with an input signal and provides information to a signal code generator 108. The signal code generator 108 generates a code associated with the peak reduction. The signal code generator 108 can be a look up table and/or algorithm that provides information regarding modifications to the input signal.

The peak detector 104 provides the modulated signal to a signal splitter or signal decomposer 106. The signal splitter 106 decomposes the signal into two or more replicas of the input signal with each replica having peak amplitudes that are less than or below the peak amplitudes of the input signal. For example, the number of replicas and/or the scaling of the replicas can be determined by the peak detector 104. The peak detector 104 provides this information to the signal code generator 108, which generates a code that provides the necessary information to the receiver for reconstructing and resealing the two or more replicas into the wanted signal. The two or more replicas and the signal code are then provided to a signal combiner 110 that combines the two or more replicas and the instruction code into a predetermined order for transmission.

The signal combiner 110 then provides the sequentially ordered two or more replicas to a DAC 112 (e.g., 1-bit delta sigma DAC, multi-bit delta sigma DAC). The DAC 112 converts the signals from the digital domain to the analog domain. The analog signals are then provided to an amplifier system 114 for amplification and transmission as an output signal. The amplifier system 114 includes a power amplifier (not shown) that can be a linear amplifier (e.g., Class-A, Class-AB, Class-B) biased to handle the peak reduced replicas, such that operational efficiency of the power amplifier is improved compared to a transmitter without peak reduction.

FIG. 6 illustrates a receiver 120 in accordance with an aspect of the present invention. The receiver 120 is operative to receive transmission signal that include peak reduced input signals and instruction signals that are received in parallel or sequentially with the peak reduced input signal. The receiver 120 includes a detector/decoder 122 that detects a transmission signal from a transmitter, decodes the detected transmission signal and provides that detected transmission signal to a demodulator 124. The demodulator 124 removes the modulation from the input signal to provide a demodulated input signal to a signal separator 126. The signal separator 126 separates the instruction signal from the input signal. For example, if the instruction code or signal is embedded into the input signal, the signal separator 126 removes the instruction code or signal from the transmission signal and provides the instruction code or signal to an instruction code or signal resolver 128. Concurrently, the signal separator 126 removes the peak reduced input signal from the transmission signal and provides the peak reduced input signal to a signal corrector 130.

If the instruction code is a signal that is sequential with the input signal, then the signal separator 126 provides the instruction code or signal portion directly to the instruction code or signal resolver 128, and the peak reduced input signal directly to the signal corrector 130. The instruction information can reside in the instruction code or signal or reside at the receiver where it can be accessed employing the instruction code or signal. The instruction code or signal resolver 128 resolves information associated with the instruction code or signal and provides the appropriate scaling factor to the signal corrector 130. The signal corrector 130 then scales the peak reduced input signal to restore the peak reduced input signal to its original wanted form.

Figure 7:
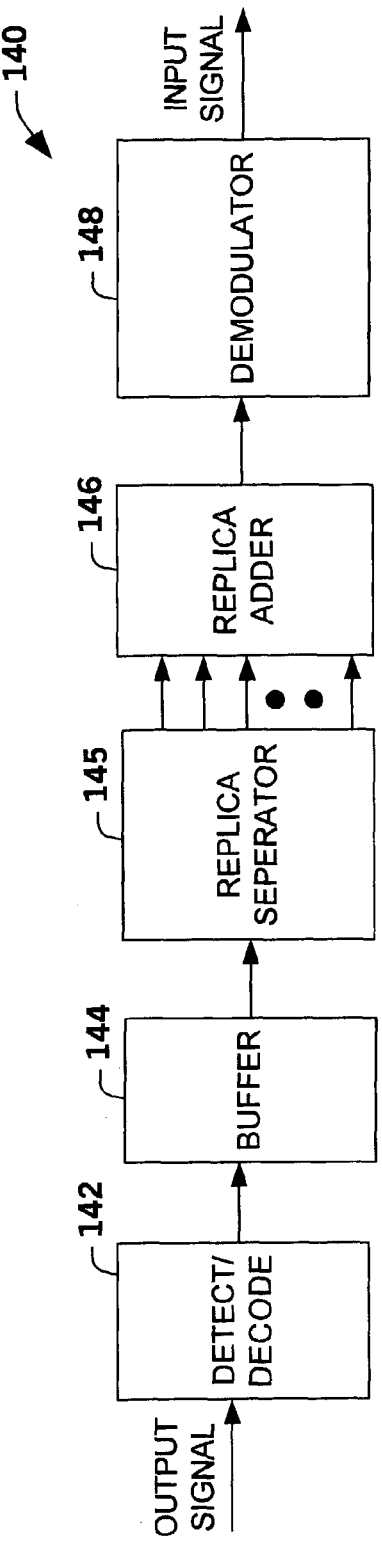
FIG. 7 illustrates a schematic block diagram of a receiver that reconstructs a plurality of replica signals into a wanted signal in accordance with another aspect of the present invention.

FIG. 7 illustrates a receiver 140 in accordance with another aspect of the present invention. The receiver 140 is operative to receive transmission signal that includes two or more replicas of the input signal that may or may not include an instruction signal. The receiver has a separate signal chain for each replica signal. Each chain has a variable or fixed delay (fixed if the replica delay is fixed by the transmitter). The receiver can either determine the delays or receive instructions on the delays. In the latter case one of the signal chains is detected and then all the chains are detected using the proper instructions. If the receiver determines the delays then each signal chain is digitized and the delays are varied until the signals are maximally correlated. Once the proper delays are employed all chains are added together and then detected/demodulated and decoded as needed.

The receiver 140 includes a detector/decoder 142 that receives transmission signal that includes two or more replicas of the input signal that may or may not include an instruction signal. The two or more replica signals are then provided to a buffer 144 for temporary storage and to apply the appropriate delays to each replica. A replica separator 145 sequences the retrieval of the replicas from the buffer 144 based on their associated delays and provides the two or more replica signals to a replica adder 146. The replica adder 146 then recombines the replica signals into the wanted signal. The wanted signal is then provided to a demodulator 148 that demodulates the wanted signal to provide the original input signal.

Figure 8:
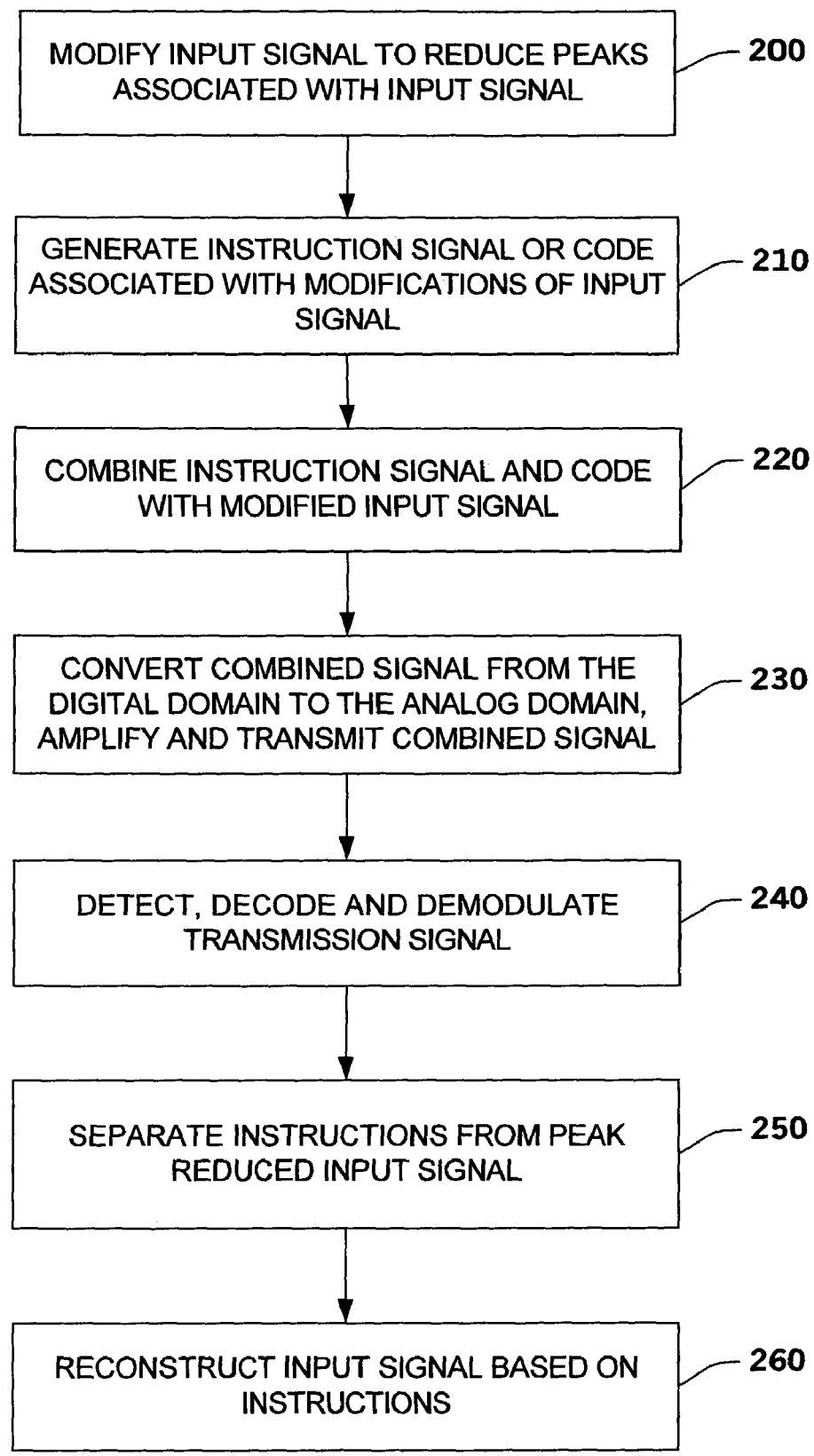
FIG. 8 illustrates a methodology for transmitting and receiving a signal in accordance with an aspect of the present invention.
Figure 9:
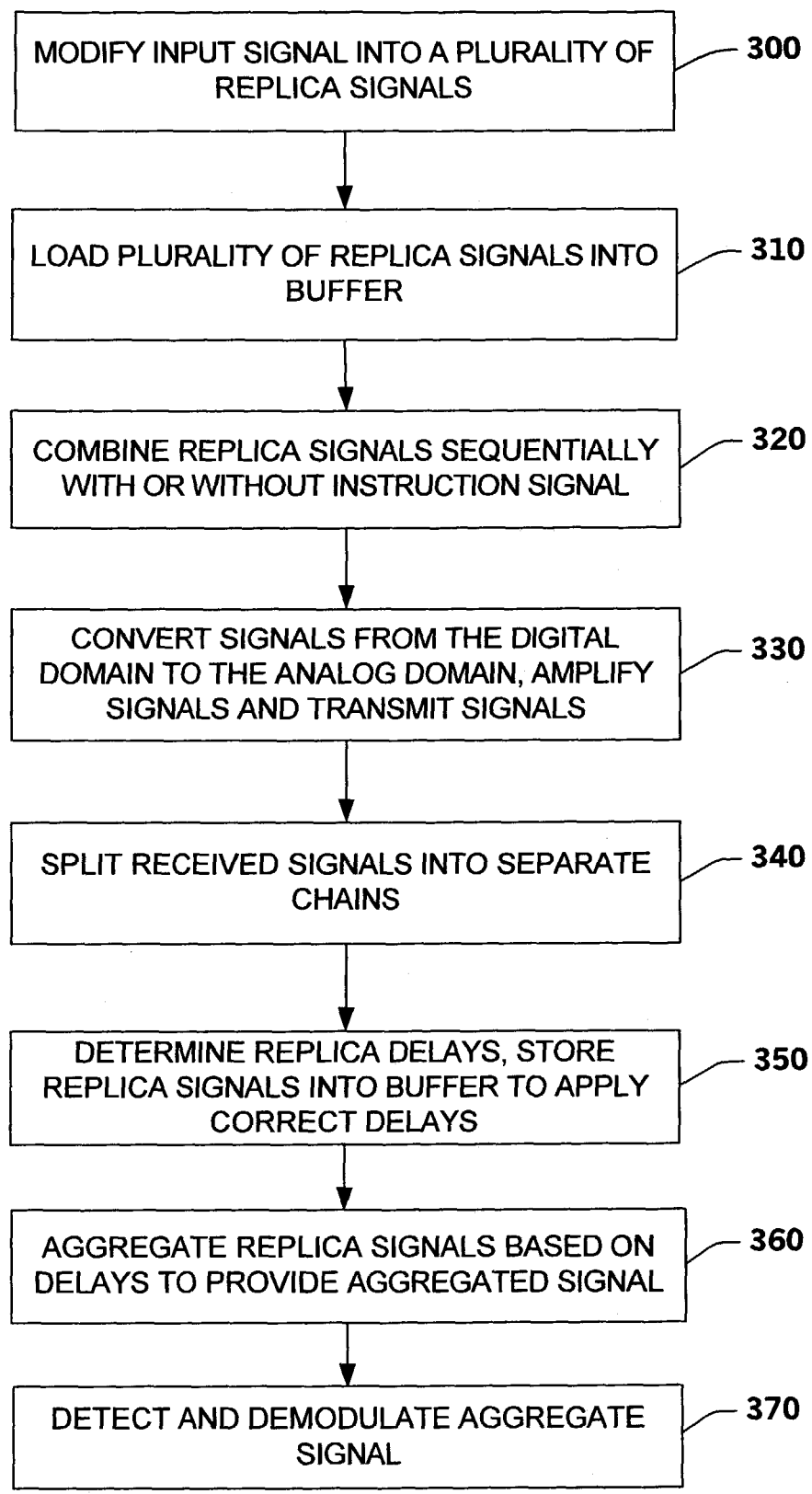
FIG. 9 illustrates a methodology for transmitting and receiving a signal in accordance with another aspect of the present invention.

In view of the foregoing structural and functional features described above, methodologies in accordance with various aspects of the present invention will be better appreciated with reference to FIGS. 8-9. While, for purposes of simplicity of explanation, the methodologies of FIGS. 8-9 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 8 illustrates a methodology for transmitting a signal in a communication system in accordance with an aspect of the present invention. The methodology begins at 200 where an input signal is modified to reduced peaks associated with the input signal. The input signal can be an input signal that conforms to a variety of different wireless formats (e.g., WCDMA, OFDM, multi-carrier versions of GSM, CDMA 2000). The input signal can be modified by employing signal or constellation shaping to reduced peaks associated with the input signal. Other techniques can be employed to reduce peak to average (PAR) levels including clipping, and selection of optimum signal components (e.g., carrier phase, code selection, frequency, code timing offset). The methodology then proceeds to 210.

At 210, an instruction signal or code is generated. The instruction signal or code is associated with modifications of the input signal, and includes instructions or codes for reconstructing the input signal at the receiver. At 220, the instruction signal or code is combined with the modified input signal. The instruction signal or code can be combined sequentially (e.g., transmitted in sequence) or in parallel (e.g., instruction signal or code combined within the modulation of the input signal). For example, the addition of a unique code channel(s) can be employed for the instruction signal for communications using code channels (e.g., CDMA, WCDMA, CDMA2000, spread spectrum). The instruction signal can be provided in one or a few specific frequencies in systems employing multiple carriers to convey information (e.g., OFDM, MC-CDMA, DMT). The instruction signal can be provided in an additional time slot for systems operating with TDMA. At 230, the combined modified input signal and instruction signal or code is converted from the digital domain to the analog domain, amplified and transmitted as a transmission signal over a wireless link. The methodology then proceeds to 240.

At 240, a receiver receives the transmission signal by detecting and decoding the transmission signal. The transmission signal is then demodulated to remove the modulation associated therewith. At 250, the instruction signal and the modified input signal are separated. The instruction signal and the modified input signal can be separated by removing the instruction signal or code embedded in the modified input signal or by temporarily storing the instruction signal and the modified input signal in a buffer or the like. The instruction signal is then employed to reconstruct the modified input signal into the originally wanted signal at 260. For example, the instruction signal can be employed to select a scaling factor to scale the modified input signal to its original form at peak areas or to a fixed scale over the entire modified input signal. It is to be appreciated that a variety of other techniques can be employed to reconstruct the modified input signal into the originally wanted signal.

FIG. 9 illustrates a methodology for transmitting a signal in a communication system in accordance with another aspect of the present invention. The methodology begins at 300 where an input signal is decomposed into a plurality of replica signals. The input signal can be an input signal that conforms to a variety of different wireless formats (e.g., WCDMA, OFDM, multi-carrier versions of GSM, CDMA 2000). At 310, the plurality of replica input signals can be temporarily loaded into a buffer for transmission. At 320, the plurality of replica signals are combined sequentially with or without an instruction signal to provide a transmission signal comprised of a plurality of sequential replica signals each having peak signals that are less than the peak signals of the original input signal. The methodology then proceeds to 330.

At 330, the plurality of sequential replica signals are converted from the digital domain to the analog domain, amplified and transmitted as a transmission signal over a wireless link. The methodology then proceeds to 340. At 340, a receiver receives the transmission signal by reversing the steps in the transmitter. A separate signal chain is used to digitally process each expected replica signal, for example, one signal chain per replica expected. The receiver either knows a priori or determines from the signals (empirically or from an embedded instruction) the delays of each replica. In the case of an embedded instruction, additional processing must be performed on one version of the chain to extract the instruction. Having determined the proper delays, each signal chain is stored into a buffer to apply the correct delays at 350. At 360, the replica signals are aggregated to provide an aggregated signal and reconsitute the desired signal. The aggregated signal is then detected and demodulated at 370.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A communication device comprising:
    a signal splitter that decomposes an input signal into a plurality of replica signals, each of the plurality of replica signals being substantial replicas of the input signal scaled in amplitude and having a sum that is approximately equal to the input signal, such that each of the plurality of replica signals has a maximum peak value below the maximum peak value of the input signal;
    a signal combiner that sequentially orders the plurality of replica signals for transmission; and
    a power amplifier that amplifies the sequentially ordered plurality of replica signals to provide a transmission signal.

2. The transmitter of claim 1, the signal combiner combines an instruction signal with the plurality of replica signals, the instruction signal informs a receiver of at least one of the number of replica signals and an amplitude scaling associated with the replica signals.

3. The communication device of claim 2, wherein the instruction signal is configured as an orthogonal code that is combined with the sequentially ordered plurality of replica signals prior to transmission from the communication device.

4. The communication device of claim 2, wherein the sequentially ordered plurality of replica signals occupies a first frequency band and the instruction signal occupies at least one additional frequency band, the instruction signal and the sequentially ordered plurality of replica signals being transmitted substantially concurrently from the communication device.

5. The communication device of claim 2, wherein the instruction signal and the sequentially ordered plurality of replica signals are modulated in a time-division multiple access (TDMA) manner prior to transmission.

6. The communication device of claim 1, wherein a known instruction code associated with reconstructing the input signal to its original form prior to modification resides at a receiver that receives the plurality of replica signals, such that the receiver is configured to reconstruct the input signal to its original form prior to modification based on the known instruction code.

7. A communication system comprising:
    means for decomposing an input signal into a plurality of replica signals that are each substantial replicas of the input signal scaled in amplitude and having a sum that is approximately equal to the input signal, such that each of the plurality of replica signals has a maximum peak value below the maximum peak value of the input signal;
    means for sequentially ordering the plurality of replica signals as a modified input signal;
    means for generating an instruction signal associated with reconstructing the input signal to its original form prior to modification;
    means for transmitting a transmission signal that includes the modified input signal and the instruction signal transmitted in a parallel relationship, such that the instruction signal is transmitted concurrently with the modified input signal;
    means for receiving the transmission signal; and
    means for reconstructing the input signal to its original form from the modified input signal prior to modification employing the instruction signal that was transmitted in the parallel relationship with the modified input signal.

8. The system of claim 7, further comprising means for combining the modified input signal and the instruction signal into the transmission signal.

9. The communication device of claim 8, wherein the means for combining comprises means for modulating the instruction signal as an orthogonal code into the modified input signal prior to transmission from the communication device.

10. The communication device of claim 8, wherein the means for combining comprises means for modulating the instruction signal into the modified input signal in a time-division multiple access (TDMA) manner prior to transmission.

11. The communication device of claim 7, wherein the means for transmitting is configured to transmit the modified input signal at a first frequency band and to transmit the instruction signal at at least one additional frequency band substantially concurrently from the communication device.

12. A method of transmitting a signal in a communication system comprising:
    modifying an input signal into a plurality of replica signals, each of the plurality of replica signals being substantial replicas of the input signal scaled in amplitude and having a sum that is approximately equal to the input signal, such that each of the plurality of replica signals has a peak value below the maximum peak value of the input signal;
    sequentially ordering the plurality of replica signals into a transmission signal;
    converting the transmission signal from the digital domain to the analog domain;
    amplifying the transmission signal; and
    transmitting the transmission signal.

13. The method of claim 12, further comprising reconstructing the plurality of replica signals into the input signal in its original form prior to modification.

14. The method of claim 13, further comprising modulating an instruction signal as an orthogonal code into the transmission signal prior to transmission, the instruction signal being employed by a receiver to reconstruct the input signal in its original form prior to modification.

15. The method of claim 13, further comprising transmitting the transmission signal at a first frequency band and transmitting an instruction signal at at least one additional frequency band substantially concurrently, the instruction signal being employed by a receiver to reconstruct the input signal in its original form prior to modification.

16. The method of claim 13, further comprising modulating an instruction signal into the transmission signal in a time-division multiple access (TDMA) manner prior to transmission, the instruction signal being employed by a receiver to reconstruct the input signal in its original form prior to modification.

17. The method of claim 13, wherein reconstructing the plurality of replica signals into the input signal comprises reconstructing the plurality of replica signals into the input signal in its original form prior to modification based on a known instruction code associated with reconstructing the input signal to its original form that resides at a receiver that receives the plurality of replica signals.

* * * * *